(12) United States Patent
Edmond et al.

(10) Patent No.: US 6,376,082 B1
(45) Date of Patent: *Apr. 23, 2002

(54) EXTERIOR WEATHERABLE ABRASION-RESISTANT FOLDABLE PLASTIC WINDOW FOR CONVERTIBLE TOPS

(75) Inventors: Stanley Edmond, Woodland Hills; Daniel M. Gelfand, Cerritos; Emery Szabo, Seal Beach, all of CA (US)

(73) Assignee: Ellay, Inc., Los Angeles, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/781,175

(22) Filed: Jan. 9, 1997

(51) Int. Cl.[7] .............................. B60J 1/08; B32B 27/30; B32B 27/40
(52) U.S. Cl. ................................ 428/424.6; 296/146.1; 296/147
(58) Field of Search ........................ 428/424.6; 296/147, 296/146.1

(56) References Cited

U.S. PATENT DOCUMENTS 4,404,258 A * 9/1983 Loewrigkeit et al. .... 428/424.6
4,652,466 A * 3/1987 Thoma et al. .............. 427/244

FOREIGN PATENT DOCUMENTS

DE 41 19273 A1 * 12/1992

* cited by examiner

*Primary Examiner*—D. S. Nakarani
(74) *Attorney, Agent, or Firm*—Christie, Parker & Hale, LLP

(57) ABSTRACT

A window for use in a vehicular convertible top comprises a thin, flexible, optically transparent plastic substrate sheet, and a thin, flexible, optically transparent abrasion-resistant protective outer film layer adherently bonded as a permanent coating to both sides of the plastic substrate sheet. The protective outer film layer comprises a weatherable polymer which is transparent in thin film form reacted with a cross-linking agent and blended with a dispersed lubricant to provide a level of abrasion-resistance and a self-lubricating exterior surface to the finished protective outer film. The window withstands repeated folding and unfolding without self-adhesion of the contacting surfaces owing to the release properties provided by the lubricant. In one embodiment, the weatherable polymer comprises a solvent based solution of a polyurethane material reacted with a polyisocyanate cross-linking agent and blended with a polyol-ester glycol-based external lubricant.

12 Claims, 2 Drawing Sheets

EXTERIOR WEATHERABLE ABRASION-RESISTANT FOLDABLE PLASTIC WINDOW FOR CONVERTIBLE TOPS

FIELD OF THE INVENTION

This invention relates to windows for convertible tops, and more particularly, to a process for making a clear flexible plastic convertible window having a weatherable abrasion-resistant outer surface. The window can be folded and unfolded repeatedly without causing undesired self-adhesion of the contacting surfaces.

BACKGROUND OF THE INVENTION

Convertible tops for automobiles, boats and other recreational vehicles are characterized by their familiar foldable top which is made of nylon or other rugged, flexible and waterproof material. The convertible top has an optically clear as window which is often made of a flexible plastic material that withstands folding. Clear plastic convertible windows are commonly made from optically transparent sheets of polyvinyl chloride (PVC) which are desirable because of their flexibility and weatherability. However, such flexible thermoplastic PVC sheets do not have a high level of resistance to abrasion damage. In fact, scratching of clear plastic convertible windows is the major problem confronted by end-users, as well as those involved at various levels in the business of manufacturing, transporting and installing foldable clear plastic windows in convertible tops.

In recent years the windows for convertible tops have been largely made from window glass to avoid the abrasion problems of clear plastic convertible windows. However, window glass is not an entirely problem-free alternative because window glass is substantially heavier than plastic; it is breakable; it is more expensive; and it is not foldable, and therefore additional space is taken up when the convertible top is folded. In certain models of cars a foldable clear plastic window is the only option because of space constraints.

Thus, there is a need for a transparent plastic convertible top window which is weatherable, foldable and scratch-resistant.

SUMMARY OF THE INVENTION

Briefly, one embodiment of this invention comprises a window for use in a vehicular convertible top comprising a thin, flexible, optically transparent plastic substrate sheet; and a thin, flexible, optically transparent, abrasion-resistant protective outer film layer adherently bonded as a permanent coating to at least one face of the plastic substrate sheet. The protective outer film layer comprises a transparent weatherable film-forming polymeric material reacted with a cross-linking agent to provide thermosetting properties including a useful level of scratch-resistance in the finished protective outer film layer. The protective film also includes a dispersed lubricant additive which provides a non-tacky self-lubricating exterior surface in dry film form that enables repeated folding and unfolding of the window without self-adhesion of the contacting surfaces.

In one form of the invention, the polymeric material contained in the protective outer coating predominantly comprises a polyurethane material. A minor amount of a polyvinyl chloride additive is included to promote adhesion of the finished coating to the plastic substrate window material which is typically made of PVC. A polyisocyanate cross-linking agent is reacted with the polyurethane material to produce the thermosetting properties in the finished film. A polyglycerol ester lubricant additive produces external surface lubricity in the finished dry film.

Thus, the invention provides an improved convertible window in which the coating adherently bonds as a permanent protective outer layer to the PVC core of the window. In its finished form the window has (1) abrasion resistance much greater than the PVC core, (2) weatherability, (3) transparency brought about by resistance to hazing of the protective coating material, and (4) release properties of the self-lubricating surfaces that allow repeated foldability of the window. The invention overcomes the disadvantages of window glass convertible top windows. The resulting flexible plastic convertible window also avoids abrasion defects from occurring during manufacturing, shipment to the installation site, installation of the window in the convertible top, and shipment of the finished product to the dealer. As a result of the invention, OEM rejections can be greatly reduced while providing considerable savings in the cost of labor and materials, not to mention the longer life of the convertible window itself during use.

These and other aspects of the invention will be more fully understood by referring to the following detailed description and the accompanying drawings.

DETAILED DESCRIPTION

Figure 1:
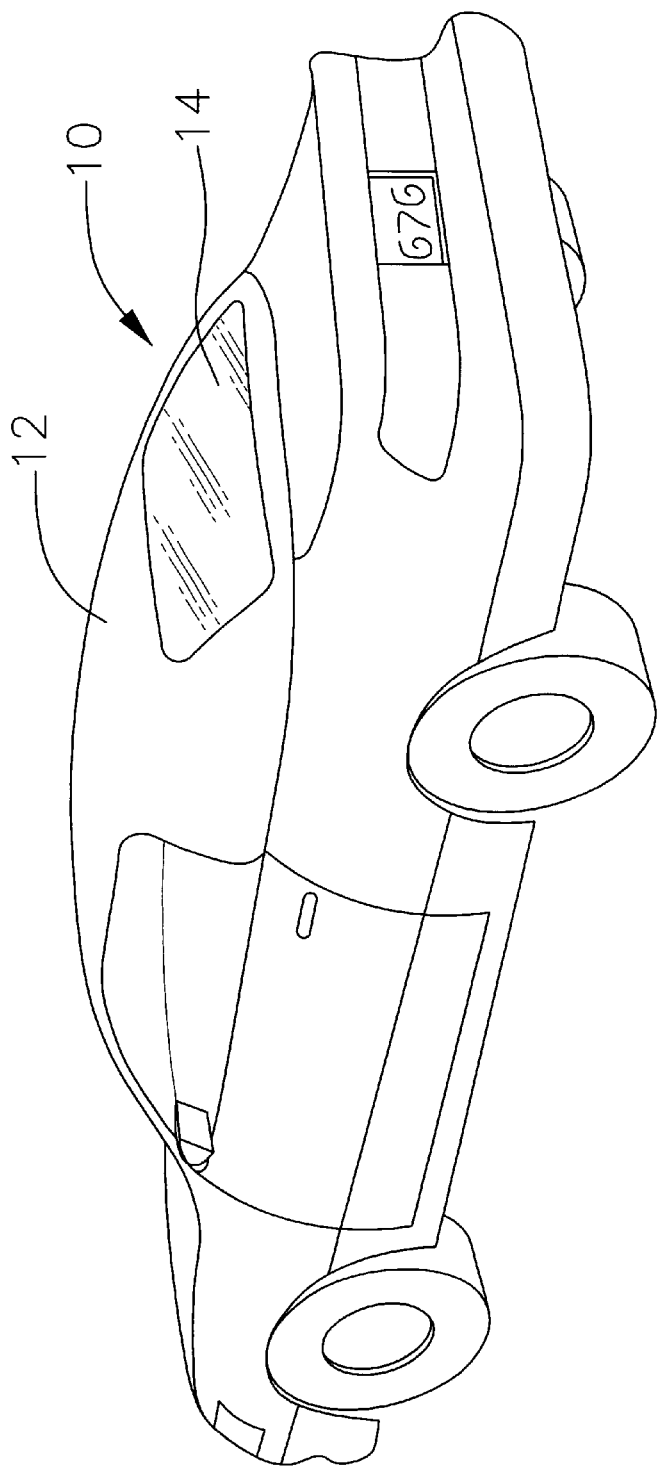
FIG. 1 is a perspective view showing an automobile with a convertible top having an abrasion resistant foldable plastic convertible window made according to principles of this invention.

Referring to FIG. 1, an automobile 10 has a convertible top 12 with a flexible, optically clear plastic rear convertible window 14. The automobile convertible top of FIG. 1 illustrates a typical use of the invention which can also be used in clear plastic windows of convertible tops for boats or other recreational vehicles.

Figure 2:
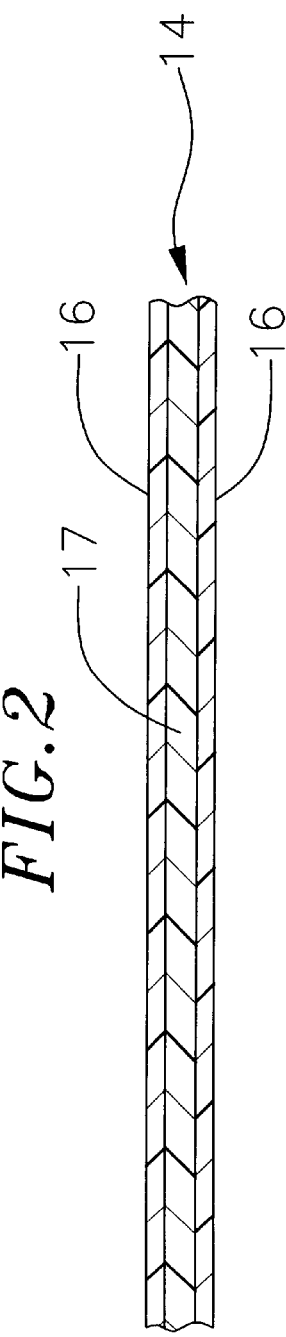
FIG. 2 is a schematic cross-sectional illustration of the convertible window of this invention.

FIG. 2 schematically illustrates the present invention which involves applying an optically clear, flexible, abrasion-protective coating 16 to opposite sides of a clear plastic sheet 17 of a convertible window material such as PVC. The coating is applied during the manufacturing process. The composition of the coating and examples of its preparation and use are described in detail below.

Figure 3:
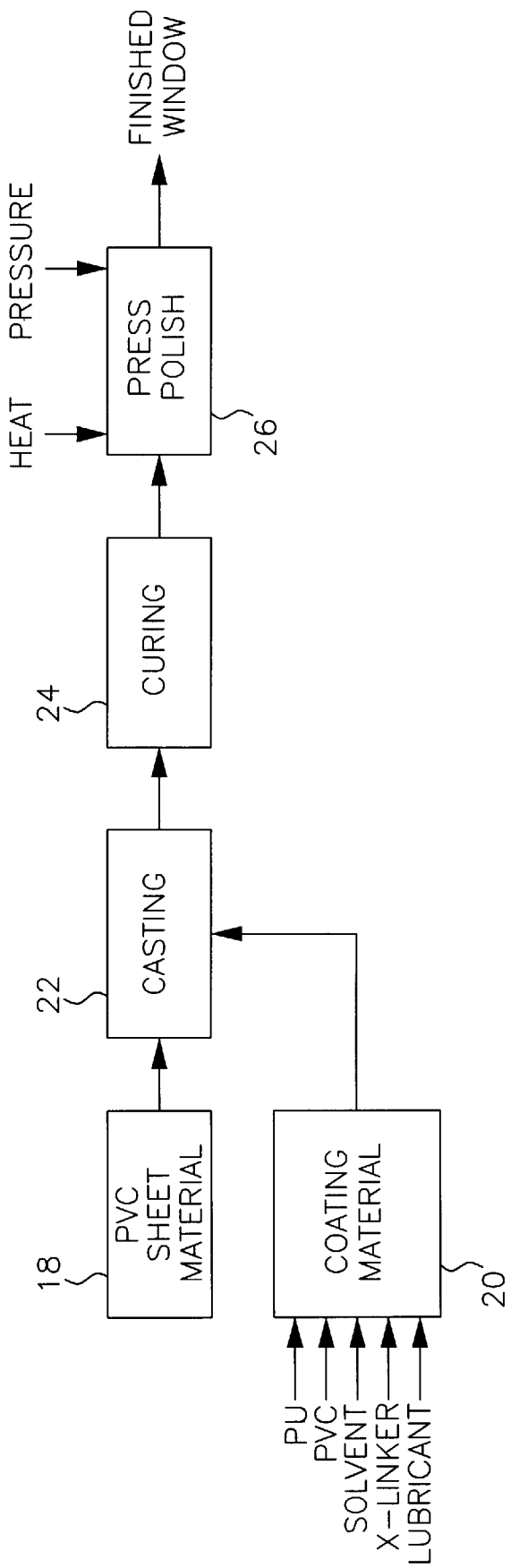
FIG. 3 is a schematic block diagram illustrating a progression of steps in one embodiment of a process for manufacturing a convertible window with the protective self-lubricating abrasion-resistant exterior coating of this invention.

One embodiment of a coating process according to the invention is illustrated schematically in FIG. 3. The starting material for the convertible window comprises a sheet 18 of a flexible, weatherable, clear plastic convertible window material. A presently preferred material, as mentioned previously, is polyvinyl chloride or other polymer blend principally containing polyvinyl chloride. The transparent sheets of PVC may be formed in a specified window size and of a desired sheet thickness. Such plastic windows in their finished form, for example, may be made with a sheet thickness from about 20 to about 40 mils. As an alternative to forming individual window-size sheets, the starting material may comprise a continuous sheet of PVC provided as a traveling web material.

Separately, components of a protective outer film coating formulation 20 are uniformly mixed in a vessel. The principal component comprises an optically clear weatherable polymeric material capable of being cast in thin film form. It is also desirable that the polymeric material have good adhesion to PVC, good flexibility, and the capability of being cross-linked to form a hard, durable film. The preferred polymeric base material is a polyurethane material. A further weatherable polymeric material such as a polyvinyl chloride homopolymer is blended with the polyurethane material to enhance adhesion of the finished dry film coating to the PVC core. The polyurethane and PVC resin materials are dissolved in suitable organic solvents to produce a clear liquid solution of the weatherable polymeric blend. Shortly before applying the material as a thin film coating to the PVC substrate sheet, a cross-linking agent is reacted with the polyurethane material and a lubricant additive is dispersed in the solvent-based polymeric blend.

The coating material is then applied as a thin-film form liquid coating to the PVC sheet material by one of several casting techniques 22. In one embodiment, P film sheets, preferably 20 mils thick, are each coated on one side only by casting the coating material as a surface film. Alternatively, a two-ply PVC sheet, preferably 40 mils thick, formed by face-to-face contact of two 20 mil PVC sheets, can be coated on both sides by casting the coating material. As a further alternative, the coating material can be liquid-cast in thin form onto a continuous traveling sheet of PVC. The PVC sheet coated on one side, can be later joined face-to face with a second coated PVC sheet in a subsequent lamination step described below. As another alternative casting step, the coating material can be cast on a suitable flexible heat-resistant carrier film such as a traveling web of polyester (PET) or casting paper. The separately formed, carrier-supported thin film for coating then can be later cured or hardened and transfer laminated to the PVC sheet, for example.

Preferred techniques for casting the coating material onto the PVC substrate sheet or carrier film are b extrusion die coating, bar coater, or reverse roll coating, for ample. Other techniques for applying the thin-film form liquid coating material onto the PVC substrate sheet also can be used within the scope of the invention.

The coated plastic film substrate material is en subjected to a curing cycle 24, preferably by the application of external heat, for cross-linking the protective film coating material and for evaporating the solvents, to produce a dry film form protective coating bonded to the outer surface of the PVC sheet. Following the curing cycle, the coated PVC sheet material is subjected to cooling and aging.

In one embodiment of the invention, in which the protective coating material has been applied to one side of each PVC substrate sheet, the coated sheets, following the curing, cooling and aging steps, are subjected to a press-polishing cycle 26. Separate sheets of the coated PVC substrate material are joined together with the PVC sides facing one another, followed by application of heat and pressure in a laminating press. This fuses the two PVC sheets together to form a continuous unitary transparent PVC core while polishing the abrasion-resistant outer film layers on opposite sides of the finished substrate sheet. The press-polishing step produces a glass-like surface on the finished film. The press-polishing step also applies a level of heat higher than the previous curing cycle to finish-cure the outer film coating to a more highly cross-linked condition.

Alternatively, a 40 mil thick PVC sheet coated on both sides with the protective coating material can be subjected to the curing cycle 24 for curing and cross-linking the urethane component of the outer film layers. In this instance, the finished substrate sheet, coated on both sides, is then press-polished in the lamination press after the cooling and aging steps.

The components of the coating material will now be described in more detail. In one embodiment of the invention, the transparent weatherable polyurethane material principally comprises a UV-stabilized aliphatic polyester-based thermoplastic polyurethane material. The presently preferred material is available under the designation Morthane PN03 from Morton Chemical Co., Seabrook, N.H. This material is selected for its scratch resistance, transparency, weatherability and foldability in dry thin film form when appropriately cross-linked to a hard, durable but flexible coating material. Generally speaking, the polyurethane-based component comprises at least about 60% of the solids contained in the film-forming material. In a preferred formulation the Morthane PN03 component comprises about 65% to about 70% of the solids contained in the coating material.

The preferred PVC additive preferably comprises a high molecular weight PVC homopolymer designated GG 2110 available from Georgia Gulf Corp., Plaquemine, La. The PVC additive is blended with the polyurethane material contained in the formulation to enhance adhesion of the finished coating to the PVC substrate sheet by adding surface roughness which breaks up the polyurethane surface uniformity. Generally, the GG 2110 PVC material comprises about 10% to about 15% of the solids contained in the film-forming material.

The polyurethane base material and PVC additive are dissolved in a solvent which preferably comprises a solvent blend of tetrahydrofuran and N,N-dimethyl formamide. The solvents are selected for their ability to dissolve the polymeric resin materials to form a polyurethane/PVC blend in solution form without hazing and while enhancing film-forming properties. The two solvents are contained in the desired solvent blend in approximately a 50/50 ratio.

The presently preferred cross-linking agent is an aliphatic polyisocyanate material available under the designation Desmodur-N75 from Farbenfabriken Bayer AG, Pittsburgh, Pa. Other cross-linking agents can comprise an aromatic polyisocyanate designated CB-75N available from Bayer, or dibenzoyl peroxide available from Witco Corporation, Marshall, Tex. The cross-linking agent reacts with the polyurethane material to form a hard, durable thermoset but flexible outer film coating in dry film form after the coating material is subjected to heat produced in the curing cycle and the subsequent press-polishing cycle. The cross-linking agent such as Desmodur-N75 comprises about 15% to 20% of the solids contained in the coating composition.

The preferred lubricant additive preferably comprises a polyglycerol-ester additive having lubricating properties in the sense of forming a lubricated antistatic exterior surface on the dry film form of the finished coating material. A preferred lubricating additive is a polyol-ester glycol-based liquid-form lubricant such as a decaglycerol hexaoleate available under the designation Glycolube PG from Lonza Specialty Chemicals, Fair Lawn, N.J. This lubricating material, when uniformly dispersed in an amount of about one to two percent of the solids contained in the formulation, provides an external surface as lubricant for the dry film form of the finished coating material both before and after the press-polishing step. The film has sufficient lubricity to prevent adhesion of the film to the platens of the laminating press. Other lubricant materials comprising, polyesterglycol or glycerol-based lubricants having similar lubricating properties also may be used.

Although the invention has been described with respect to solvent casting a polyurethane-based coating on a transparent PVC core, other embodiments of the invention also can be practiced without departing from the scope of the invention. For instance, the polyurethane-based polymer blend can be pelletized with the lubricant additive and extruded as a solventless film. The extruded film can be extrusion coated onto the PVC sheet, or it can be extruded as a finished free film to be used as a transparent flexible and foldable window material without the PVC core.

EXAMPLE

A coating material for forming an abrasion-resistant flexible weatherable outer surface coating for a PVC substrate sheet for use as a vehicular convertible window was produced from the following formulation:

| Ingredients | Parts |
| --- | --- |
| PN03 - polyurethane | 17 |
| GG 2110 - PVC homopolymer | 3 |
| THF - solvent | 40 |
| DMF - solvent | 40 |
| Desmodur N75 - cross-linking agent | 4 |
| Glycolube PG - lubricant | 0.2 |

The THF and DMF solvents were initially added to a vessel followed by slowly adding the GG 2110 polyvinyl chloride homopolymer and the PN03 polyurethane material in powder form one after the other to dissolve them and thereby form a solvent-based solution of these blended polymeric materials. The polyurethane and polyvinyl chloride homopolymer materials were slowly blended and mixed with the solvent combination under moderate and continued agitation without the application of external heat. The resinous materials had good solubility in the solvent blend. Approximately one hour or less before casting the liquid coating material on a PVC substrate sheet, the Desmodur N75 cross-linking agent and the Glycolube PG lubricating additive were mixed with the solvent blend both under continued moderate agitation and without the application of external heat. The PVC film was then prepared for casting by providing window size 20 mil thick sheets of PVC, followed by casting the coating material as a thin film of uniform film thickness onto one side of each PVC substrate sheet. The coating material was applied by bar coater at a layer thickness of about 9 mils in its liquid solvent-based form. The coating on the PVC sheet was then cured by passing it through an oven maintained at a temperature about 160° to 200° F. for about two hours sufficient to avoid melting of the PVC substrate while evaporating the solvents. It is believed that the level of heat applied during the curing step did not completely cross-link the polyurethane structure, however, the curing step cross-linked the polyurethane material sufficiently to produce a dry, hardened, outer surface coating on the PVC sheet. The coating had a dry film thickness of about one to two mils. The surface was non-tacky because of the lubricity produced by the Glycolube PG lubricant additive. Following the curing cycle, the coated sheets were subjected to cooling and aging. Two sheets of the previously coated PVC substrate sheets were then joined face-to-face with the coated sides facing outwardly. This two-ply composite film was then placed in a laminating press for press-polishing the coated sheets. The press included two flat polished steel platens which applied a pressure of about 500 psi at a temperature of about 375° F. for approximately the first half of the cycle after which the platens were cooled by allowing the temperature to drop off to about zero progressively for the last half of the cycle. The entire cycle extended for about 2½ hours. During the press-polishing cycle the applied pressure and heat were sufficient to fuse the two inner PVC plies together as a unitary structure, while melting the previously cross-linked outer film layers sufficiently for polishing their outer surfaces to produce a glassy smooth optically clear protective outer film. The outer coating had not been completely cross-linked during the previous curing cycle and therefore retained thermoplastic properties. The melting of the outer coating during exposure to the higher temperatures applied in the platen press produced the glasslike smooth outer surface. The higher temperature applied in the platen press also increased cross-linking density of the polyurethane structure in the finished coating. The PVC plies initially used in the process had a matte surface which minimizes entrapment of air between the joined PVC plies during the press-polishing step.

The finished coated PVC window provided a highly transparent, weatherable, flexible and foldable convertible window which, when subjected to folding and external pressure, was repeatedly released from its folded position without adhesion of the contacting surfaces. A self-adhesion test was applied to the finished coated window which was also exposed to a temperature of about 160° F. during the test. A 1,210 gram steel block weight (in cube form) was placed on the window in a folded condition to enhance surface contact. After ten minutes the contacting surfaces were easily separated from one another with no coating-to-coating adhesion. In a separate scratch test the finished window was subjected to mild abrasive action by a rough fabric material under 2.5 pounds of weight with 20 applied strokes. No scratching was revealed in the finished outer film. Adhesion of the finished film to the PVC core also was tested by freezing the window followed by a bend test which revealed no delamination.

Although the invention has been described with respect to automotive convertible tops, the invention also is applicable to other foldable outdoor fabric materials such as awnings and tops for golf carts and boats, for example.

What is claimed is:

1. A window for use in a vehicular convertible top, in which the window is sufficiently flexible and foldable to enable repeated folding and unfolding of the window during use of the convertible top, the convertible top window comprising an optically transparent plastic substrate sheet; and a protective outer film layer comprising an optically transparent abrasion-resistant protective dry film adherently bonded as a permanent coating to at least one face of the plastic substrate sheet, the protective outer film layer comprising a weatherable polyurethane material which is transparent in film form, a cross-linking agent reacted with said polyurethane material, and a lubricant additive blended with said polyurethane material, said protective outer film layer having a level of abrasion resistance sufficient for use as a convertible top window and a self-lubricating exterior surface which enables repeated folding and unfolding of the finished window without self adhesion of the contacting surfaces.

2. The product according to claim 1 in which the substrate sheet comprises a polyvinylchloride (PVC) material.

3. The product according to claim 2 in which the polyurethane material contained in the protective outer film layer is blended with a PVC homopolymer.

4. The product according to claim 1 in which the lubricant additive comprises a decaglycerol hexaoleate lubricating material.

5. The product according to claim 1 in which the polyurethane material comprises a UV stabilized aliphatic polyester-based thermoplastic polyurethane.

6. A window for use in a vehicular convertible top, in which the window is sufficiently flexible and foldable to enable repeated folding and unfolding of the window during use of the convertible top, the convertible top window comprising an optically transparent plastic substrate sheet comprising a polyvinylchloride material; and a protective outer film layer comprising an optically transparent abrasion resistant protective dry film adherently bonded as a permanent coating to at least one face of the plastic substrate sheet, the protective outer film layer comprising a weatherable polyurethane material which is transparent in film form, a cross-linking agent reacted with said polyurethane material, a polyvinylchloride material blended with the polyurethane material to enhance adhesion of the outer film layer to the substrate sheet, and a lubricant additive blended with said polyurethane material, the solids contained in said protective outer film layer being comprised predominantly of said polyurethane material, and in which said outer film layer comprises a minor amount of said polyvinylchloride material to promote said adhesion to the substrate sheet, said protective outer film layer having a level of abrasion resistance sufficient for use as a convertible top window and a self lubricating exterior surface which enables repeated folding and unfolding of the finished window without self adhesion of the contacting surfaces.

7. The product according to claim 6 in which the polyurethane material contained in the protective outer film layer is blended with a PVC homopolymer.

8. The product according to claim 6 in which the lubricant additive comprises a decaglycerol hexaoleate lubricating material.

9. The product according to claim 6 in which the polyurethane material comprises a UV stabilized aliphatic polyester-based thermoplastic polyurethane.

10. The product according to claim 6 in which the cross-linking agent comprises a polyisocyanate material.

11. A window for use in a vehicular convertible top, in which the window is sufficiently flexible and foldable to enable repeated folding and unfolding of the window during use of the convertible top, the convertible top window comprising an optically transparent plastic substrate sheet; and a protective outer film layer comprising an optically transparent abrasion-resistant protective dry film adherently bonded as a permanent coating to at least one face of the plastic substrate sheet, the protective outer film layer comprising a weatherable polyurethane material which is transparent in film form, a cross-linking agent reacted with said polyurethane material, and a lubricant additive blended with said polyurethane material, said protective outer film layer having a level of abrasion resistance sufficient for use as a convertible top window and a self-lubricating exterior surface which enables repeated folding and unfolding of the finished window without self adhesion of the contacting surfaces, in which the lubricant comprises a decaglycerol hexaoleate lubricating material, in which the substrate sheet comprises a polyvinylchloride (PVC) material, and in which the polyurethane material contained in the protective outer film layer is blended with a PVC homopolymer.

12. A window for use in a vehicular convertible top, in which the window is sufficiently flexible and foldable to enable repeated folding and unfolding of the window during use of the convertible top, the convertible top window comprising an optically transparent plastic substrate sheet comprising a polyvinylchloride material; and a protective outer film layer comprising an optically transparent abrasion resistant protective dry film adherently bonded as a permanent coating to at least one face of the plastic substrate sheet, the protective outer film layer comprising a weatherable polyurethane material which is transparent in film form, a cross-linking agent reacted with said polyurethane material, a polyvinylchloride material blended with the polyurethane material to enhance adhesion of the outer film layer to the substrate sheet, and a lubricant additive blended with said polyurethane material, the solids contained in said protective outer film layer being comprised predominantly of said polyurethane material, and in which said outer film layer comprises a minor amount of said polyvinylchloride material to promote said adhesion to the substrate sheet, said protective outer film layer having a level of abrasion resistance sufficient for use as a convertible top window and a self lubricating exterior surface which enables repeated folding and unfolding of the finished window without self adhesion of the contacting surfaces, and in which the lubricant comprises a decaglycerol hexaoleate lubricating material.

\* \* \* \* \*